(No Model.) 2 Sheets—Sheet 1.
B. C. HICKS.
BRIDGE FOR DOORWAYS OF CATTLE CARS.
No. 429,760. Patented June 10, 1890.
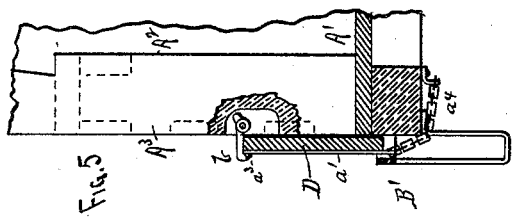
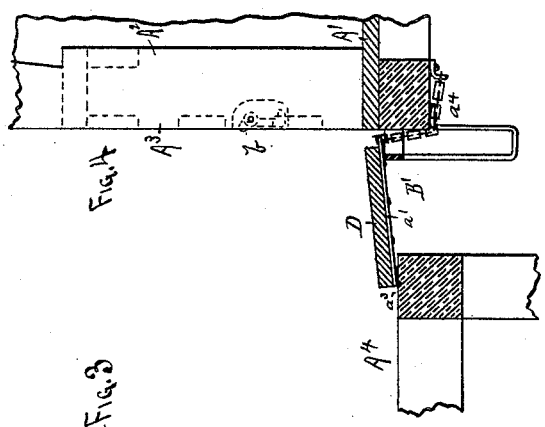
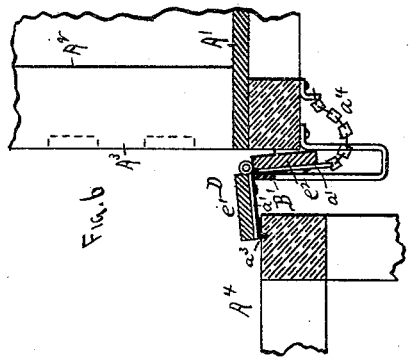
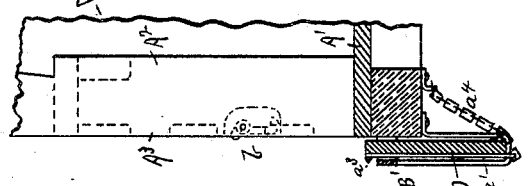
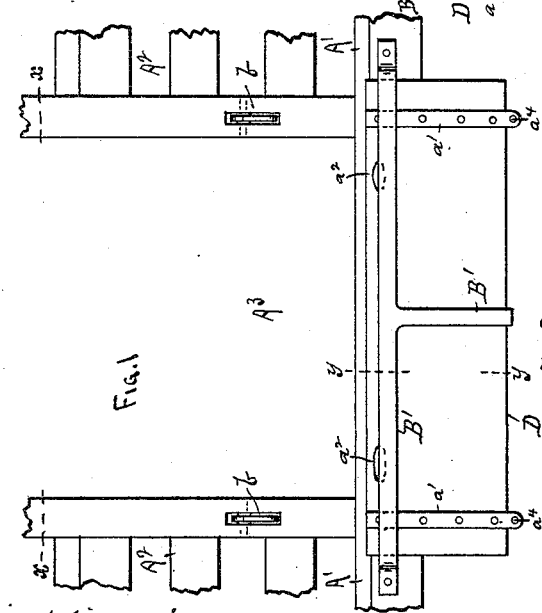
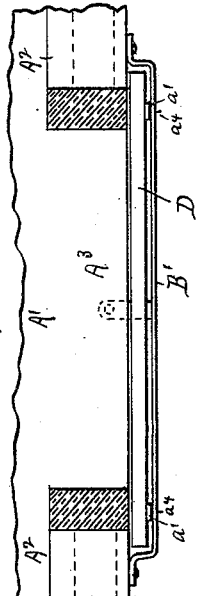
WITNESSES: H. S. Webster, Emil Wilde
John Chapin Hicks, INVENTOR, BY Charles N. Woodward, Atty.

(No Model.) 2 Sheets—Sheet 2.
B. C. HICKS.
BRIDGE FOR DOORWAYS OF CATTLE CARS.
No. 429,760. Patented June 10, 1890.
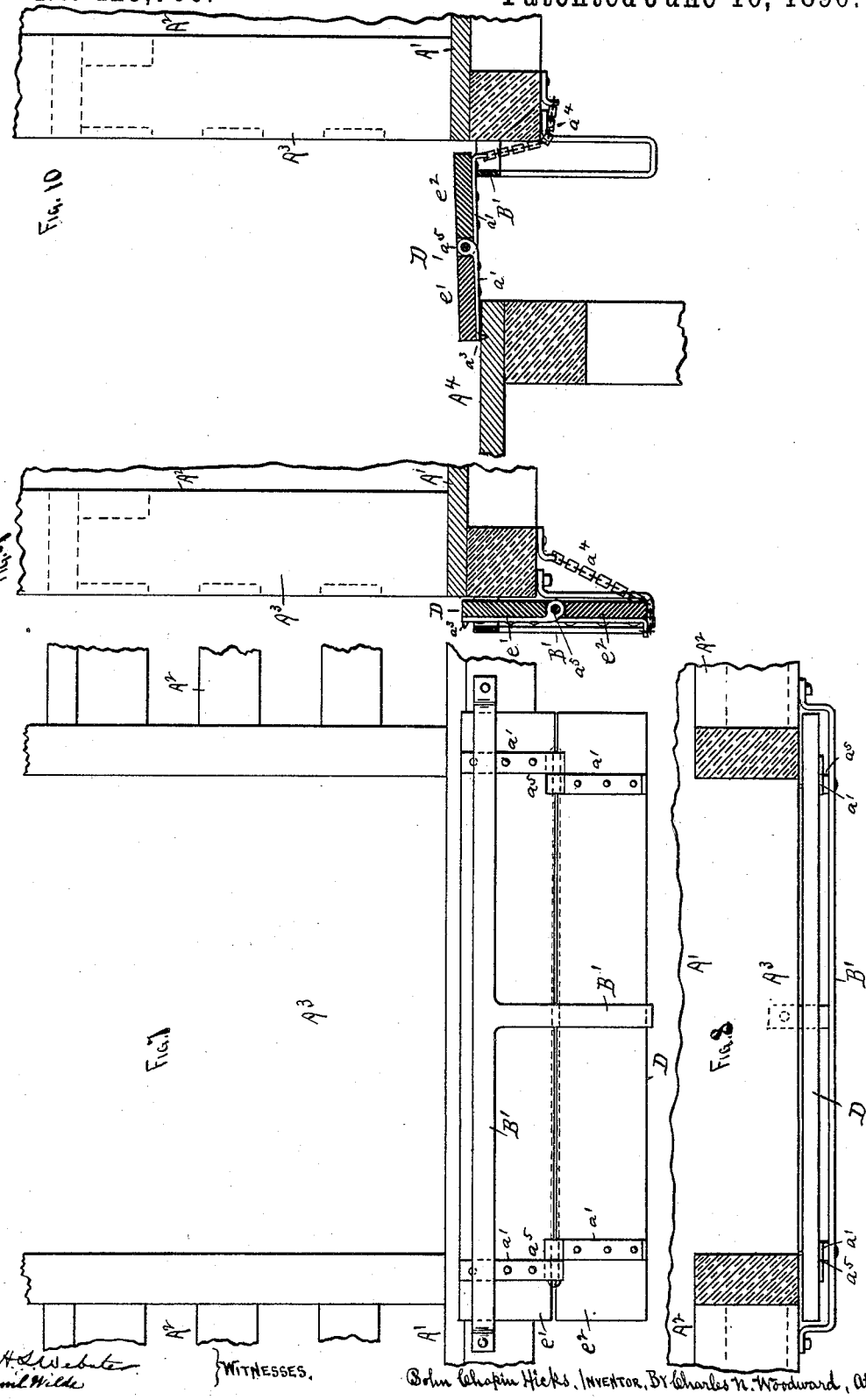

UNITED STATES PATENT OFFICE.

BOHN CHAPIN HICKS, OF MINNEAPOLIS, MINNESOTA, ASSIGNOR, BY MESNE ASSIGNMENTS, TO THE HICKS STOCK CAR COMPANY, OF WEST VIRGINIA.

BRIDGE FOR DOORWAYS OF CATTLE-CARS.

SPECIFICATION forming part of Letters Patent No. 429,760, dated June 10, 1890.

Application filed May 20, 1889. Serial No. 311,423. (No model.)

*To all whom it may concern:*

Be it known that I, BOHN CHAPIN HICKS, a citizen of the United States, residing at Minneapolis, in the county of Hennepin and State of Minnesota, have invented certain new and useful Improvements in Adjustable Bridges for the Doorways of Cattle-Cars, of which the following is a specification.

This invention relates to cattle-cars; and it consists in an adjustable gang-plank supported upon the car opposite its doorway-openings and adapted to be projected across the space between the cars and the loading or unloading platform to form bridges or gang-planks for the support of the animals when passing to or from the cars, as hereinafter shown and described, and specifically pointed out in the claims.

In the drawings, Figure 1 is a side elevation of a portion of a cattle-car, including one of its doorway-openings, with one of my improved gang-planks or bridge-frames attached thereto. Fig. 2 is a plan view in section on the line $x\ x$ of Fig. 1. Fig. 3 is a cross-sectional view on the line $y\ y$ of Fig. 1, showing the gang-plank or bridge-frame withdrawn. Fig. 4 is a similar view showing the gang-plank or bridge-frame projected outward, as it will be when in use. Figs. 5 and 6 are views similar to Figs. 3 and 4, showing different adaptations of the device. Figs. 7, 8, 9, and 10 are views similar to Figs. 1, 2, 3, and 4, but on a larger scale, illustrating some modifications in the construction and adaptations.

A' is the floor-frame; $A^2$, the side frame; $A^3$, one of the doorway-openings, and $A^4$ a section of one of the platforms to or from which the cattle are transferred, these parts being of the usual construction. Attached to the side of the floor-frame opposite the doorway-openings is a hanger-frame B', behind and by which the gang-plank or bridge-frame D is supported, as shown in Figs. 1, 2, 3, 7, 8, and 9.

The gang-plank or bridge-frame D may be formed in one or more pieces, as preferred. In Figs. 1, 2, 3, 4, and 5 it is shown formed in one piece strengthened by straps a' and with hand-holes $a^2$, by which it may be elevated and drawn outward, as shown in Figs. 4, 5, 6, and 10. When not in use, it simply rests in the hanger B' entirely out of the way of the door or other parts, and does not interfere in any manner with the operations of the car, and then when it is to be used it is only necessary to raise it up and draw it outward, with its upper or outer edge resting on the platform $A^4$, as in Figs. 4 and 10, in which position it forms a gang-plank for the passage of the animals to or from the car.

Another important function of the gang-plank is that when raised bodily upward, as in Fig. 5, it forms a gate or bar across the lower part of the doorway-opening. This function will be found very useful in connection with double-deck stock-cars, as the gates across the lower parts of the doorway-openings prevent the escape of the animals from the lower deck, while the main door is open for the discharge of animals from the upper deck.

Any suitable means may be employed to secure the gang-plank in place when employed as in Fig. 5; but for the purpose of illustration I have shown simple catches b, which are adapted to retire into the frame of the car when not in use and be drawn outward to catch over the upper edge of the gang-plank and hold it in its upright position when required.

The outer ends of the straps a' will be provided with spurs $a^3$, adapted to catch into the platform $A^4$ to support and hold the outer edge of the gang-plank, while its inner edge will be held in place by short chains $a^4$, the latter serving the double purpose of a "holdback" to keep the rear edges of the gang-plank in position, as in Fig. 10, but also to prevent the removal of the gang-plank from the car.

The gang-plank may also be constructed in the form of a flexible belt or plate, as in Figs. 6, 7, 8, 9, and 10, with the body portion D formed in two or more parts $e'\ e^2$ and with the straps $a'$ jointed at $a^5$, as shown.

It frequently happens that the space between the sides of the car and the platforms $A^4$ is very narrow, and when this occurs of course the gang-plank may be correspondingly narrow; hence the flexible construction shown in Figs. 6, 7, 9, and 10 may be advantageously employed under such circumstances, as only one portion of the gang-planks $e'\ e^2$ need be employed, as in Fig. 6. The adjacent edges of the slats $e'$ $e^2$ next the car-frame when the plank is withdrawn, as in Fig. 7, and the upper edges when the plank is projected, as in Fig. 10, will be in close proximity, while the remainder of the contiguous surfaces will be cut away, as shown in Fig. 10, so that while the plank is flexible or free to bend in one direction to secure the requisite flexibility it is prevented from bending in the other direction by the edges of the parts $e'$ $e^2$ coming in contact with each other.

The joints $a^3$ in the straps $a'$ will be close fitting, so that no end-play will occur, and if the plank $e'$ $e^2$ be supported at its ends, with the adjacent edges of the joints uppermost, it will be inflexible, as illustrated in Fig. 10, and form a rigid "bridge" between the car and platform $A^4$.

As many of the slats $e'$ $e^2$ may be employed as required; but generally two will be sufficient, as shown.

Having thus described my invention, what I claim as new is—

1. A stock-car having a hanger-frame $B'$ suspended below its doorway-opening, in combination with a gang-plank $D$, supported within said hanger-frame and adapted to be projected outward to form a bridge between said car and the loading or unloading platform for the passage of the cattle, or elevated to form a gate across the lower part of the doorway-opening, and provided with chains $a^4$, whereby its removal is prevented and its motion limited, substantially as and for the purpose set forth.

2. In a stock-car having a hanger-frame $B'$ attached thereto below the doorway-opening, the combination therewith of a gang-plank formed of two or more sections flexibly connected and adapted to be projected to the loading or unloading platform to form an adjustable bridge for the passage of the animals, and provided with chains $a^4$ to connect it to the car and limit its movement, substantially as and for the purpose set forth.

In testimony whereof I have hereunto set my hand in the presence of two subscribing witnesses.

JOHN CHAPIN HICKS.

Witnesses:
C. N. WOODWARD,
H. S. WEBSTER.